US005356694A

United States Patent [19]

Knapp

[11] Patent Number: 5,356,694

[45] Date of Patent: Oct. 18, 1994

[54] EXTRUDED CONNECTOR STRIP

[75] Inventor: Steven E. Knapp, Brossard, Canada

[73] Assignee: RCR International, Inc., Quebec, Canada

[21] Appl. No.: 33,347

[22] Filed: Mar. 18, 1993

[51] Int. Cl.[5] .......................... B32B 3/28; B32B 27/14

[52] U.S. Cl. .................................... 428/169; 428/163; 428/167; 428/173; 428/198; 428/343

[58] Field of Search ........................ 428/31, 52, 85, 88, 428/96, 100, 163, 167, 169, 173, 198, 343

[56] References Cited

U.S. PATENT DOCUMENTS 4,411,938 10/1983 Madonia et al. .................... 428/343
4,959,265 9/1990 Wood et al. ......................... 428/100
5,013,596 5/1991 Kessler ................................. 428/31

*Primary Examiner*—George F. Lesmes
*Assistant Examiner*—Blaine Copenheaver
*Attorney, Agent, or Firm*—Longacre & White

[57] ABSTRACT

An extruded connector strip is described and more particularly, but not exclusively, for use as a weather-strip connector. The connector strip has an elongated attachment body which has a flat rear attachment wall from which a pair of spaced-apart parallel flexible spacer ribs extend outwardly and sloped towards opposed elongated end edges thereof. An adhesive transfer tape is securable to at least one or more flat portions of the rear attachment wall to secure the connector strip against an object. The flexible spacer ribs permit the attachment body to be located over a connecting surface of an object to which it is intended to be secured while preventing the outer adhesive surface of the transfer tape from contacting the connecting surface until pressure is applied to the attachment body which causes the spacer ribs to flex and the outer adhesive surface of the tape to contact the connecting surface to adhere thereto.

12 Claims, 3 Drawing Sheets

EXTRUDED CONNECTOR STRIP

BACKGROUND OF INVENTION

1. Field of the Invention

The present invention relates to an extruded connector strip, and more particularly, but not exclusively, to a weatherstripping connector and wherein the connector is provided with spaced-apart flexible ribs in a rear wall thereof with adhesive transfer tape disposed between the ribs. The ribs permit the strip to be positioned over an object to which it is intended to be attached and moved thereover with the spacer ribs maintaining the adhesive surface of the tape spaced from the surface of the object to which it is intended to be secured until pressure is applied to the connector strip.

2. Description of Prior Art

It is known to provide connectors with adhesive transfer tape in a rear wall thereof whereby to secure the connectors to various objects. An example of this is vehicle mouldings which are nowadays adhesively secured to various surfaces of an automotive vehicle. With the development of improved adhesive transfer tapes, such tapes have outstanding retention force and can withstand all sorts of climatic conditions. In fact, once these adhesive tapes touch a surface, they quickly adhere thereto and usually must be destroyed if there is a need to remove them. This poses a disadvantage when securing an object to a surface as the object must be properly and exactly in position before the adhesive is caused to contact the surface. Therefore, when it is necessary to secure an object with adhesive at a precise location, it is best to provide an alignment means so that the article is supported at the precise location. It is, therefore, time-consuming to install certain articles and expensive jigs or guiding device are required.

SUMMARY OF INVENTION

It is a feature of the present invention to provide a connector strip which has an attachment body with a rear attachment wall provided with a pair of spaced-apart parallel flexible ribs permitting an adhesive transfer tape to be secured to the attachment wall between the ribs with the ribs maintaining the outer adhesive surface of the adhesive transfer tape spaced from a surface to which it is intended to be secured to until pressure is applied to the connector strip.

Another feature of the present invention is to provide an extruded weatherstrip connector having the above-mentioned feature to provide weatherstrips to be located at proper locations with respect to sliding doors and windows before securing same.

According to the above features, from a broad aspect, the present invention provides an extruded connector strip which comprises an elongated attachment body having at least a flat rear attachment wall. A pair of spaced-apart parallel flexible spacer ribs extend outwardly from the rear attachment wall. An adhesive transfer tape is securable to at least one or more flat portions of the rear attachment wall. The tape has opposed adhesive surfaces. The spacer ribs extend to a plane spaced above an outer adhesive surface of a transfer tape when secured to the flat rear attachment wall between the flexible spacer ribs. The spacer ribs permit the attachment body to be located with the rear attachment wall positioned over a connecting surface of an object to which it is intended to be secured and prevents the outer adhesive surface from contacting the connecting surface until pressure is applied to the attachment body causing the spacer ribs to flex and the outer adhesive surface of the tape to contact the connecting surface to adhere thereto. The outer adhesive surface has a retention force greater than the restoring force of the spacer ribs.

BRIEF DESCRIPTION OF DRAWINGS

A preferred embodiment of the present invention will now be described with reference to the accompanying drawings in which.

DESCRIPTION OF PREFERRED EMBODIMENTS

Figure 3:
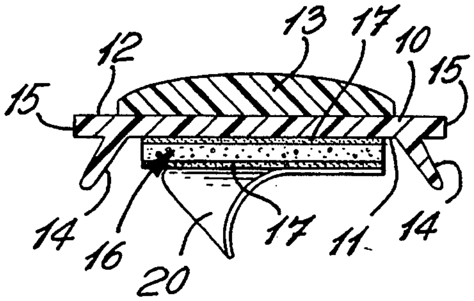
FIG. 3 is a section view through an extruded connector strip of the present invention and having an adhesive transfer tape secured to the back face thereof.
Figure 4:
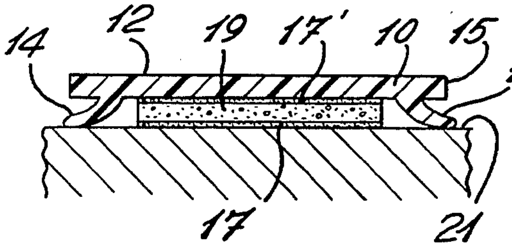
FIG. 4 is a section view showing an extruded connector strip of the present invention as secured to a surface by the adhesive transfer tape.

Referring now to the drawings, and more particularly to FIGS. 3 to 8, there will be described the construction of the connector strip of the present invention. As shown in FIGS. 3 and 4, the connector strip is formed from a plastic extruded elongated attachment body 10 of generally rectangular cross-section and having at least a flat rear attachment wall 11. The front wall 12 may be a flat wall, as shown in FIG. 4, or may have a decorative surface or embossment 13, as shown in FIG. 3, depending on the use of the strip. The embossment 13 could be a plastic moulding extruded with the attachment body 10 or may be a strip of other material glued or otherwise bonded to the front wall 12 of the attachment body.

A pair of spaced-apart parallel flexible spacer ribs 14 are also extruded with the attachment body and extend outwardly from the rear attachment wall 11. These flexible spacer ribs are located close to the opposed elongated end edges 15 of the attachment body and are very thin flexible ribs for the purpose as will be described later. The length of these ribs 14 is selected whereby to receive therebetween an adhesive transfer tape 16 with its outside adhesive surface 17 lying below the plane 18 (see FIG. 5) aligned with the ends of the flexible ribs 14.

The adhesive transfer tape is of a type well known in the art and consists of a silicone body 19 or other suitable body having opposed adhesive surfaces 17 and 17'.

Figure 5:
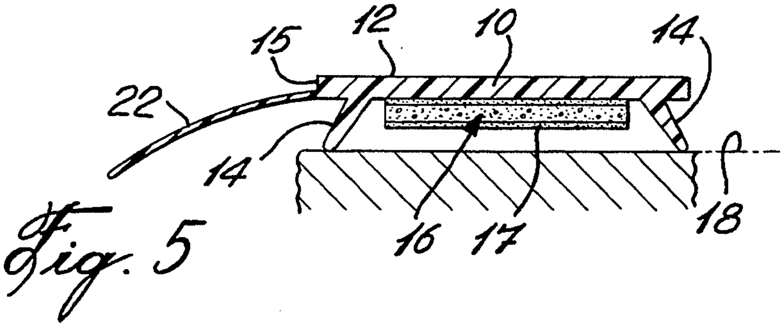
FIG. 5 is a weatherstrip version of the connector strip of the present invention having a flexible plastic member attached thereto and illustrating the function of the spacer ribs.
Figure 8:
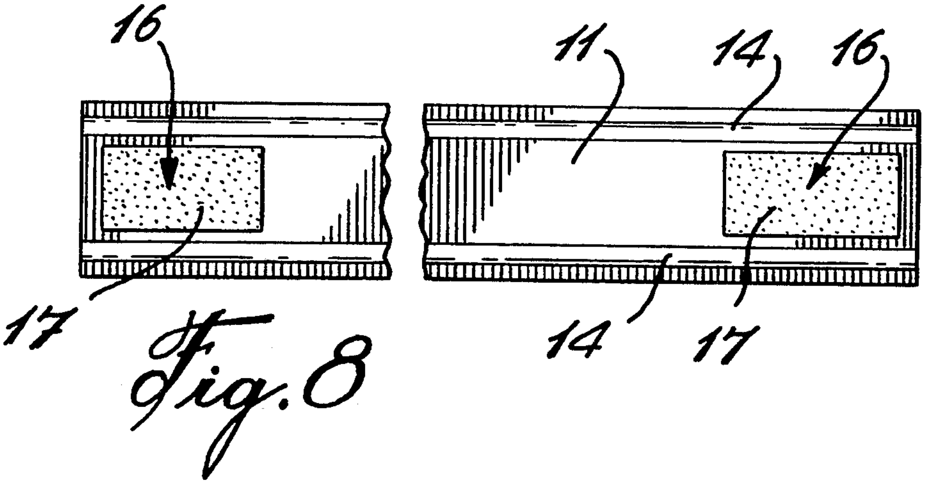
FIG. 8 is a rear view of the connector strip of the present invention.

A protective peel-off sheet 20 is usually removably retained over one of the adhesive surfaces, herein surface 17. Accordingly, once this peel-off surface 20 is removed, the outer adhesive surface 17 lies below the plane 18. This permits the extruded connector strip to be located over a surface, such as surface 21, with the outer adhesive surface 17 spaced therefrom by the spacer ribs 14. Accordingly, the connector strip can be moved and aligned on that surface with the outer adhesive surface 17 spaced from the connecting surface 21 as shown in FIG. 5. After the connector strip is in position, then pressure is applied over the front wall 12 of the strip, causing the spacer ribs 14 to flex out, as shown in FIG. 4, and the outer adhesive surface 17 to adhesively engage the connecting surface 21. It is pointed out that the adhesive surface of the tape 16 has a retention force which is greater than the restoring force of the spacer ribs 14 whereby these spacer ribs will not cause the strip to detach. The adhesive tape 16 may be short strips, such as shown in FIG. 8, and provided at various locations over the rear attachment wall 11 of the connector strip.

Figure 6:
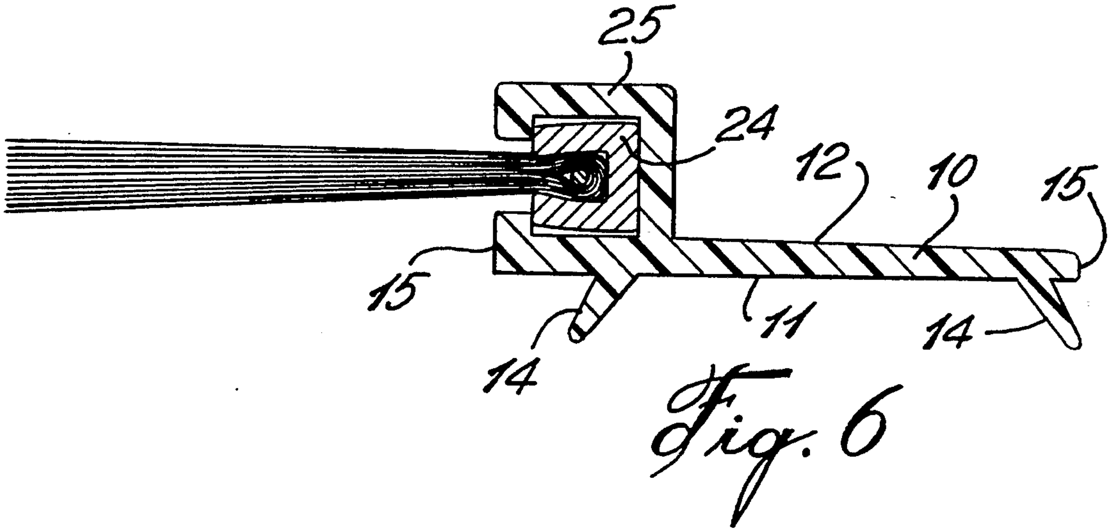
FIG. 6 is a still further version of the weatherstrip connector showing a weatherstrip element in sliding fit with a connector channel of the connector strip.
Figure 7:
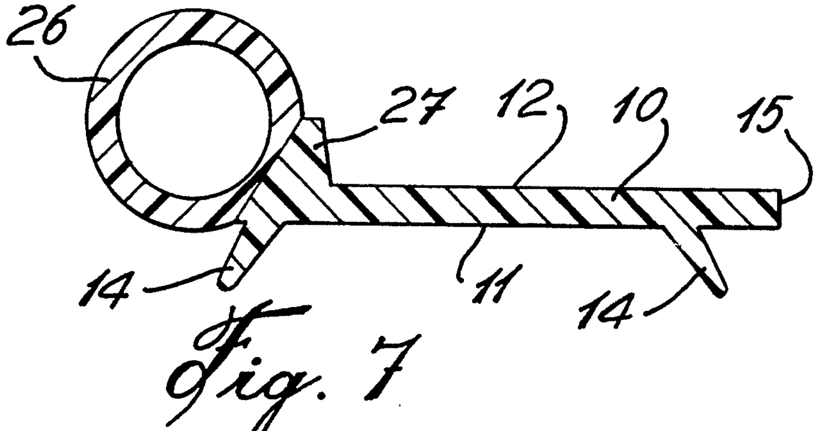
FIG. 7 is a still further version of a weatherstrip connector and wherein a tubular flexible plastic member is attached along an edge of the connector strip.

The extruded connector strip of the present invention was developed primarily, but not exclusively, for use as weatherstripping connectors and examples of these are illustrated in FIGS. 5, 6 and 7. As shown in all of these figures, all of the connector strips have a continuous rear attachment wall 11 with the spacer ribs 14 extending along the entire length of the attachment body and disposed at diverging angles and sloped outwardly towards a respective elongated end edge 15 of the attachment body. The attachment body 10 is also extruded as a rigid plastic body while still retaining some flexibility. Of course, if the connector strip is intended to be secured over curved surfaces, then this body would be extruded as a thinner strip. As shown in FIG. 5, the attachment body 10 has a flexible flap 22 extruded from one of the end edges 15 thereof. It is also pointed out that the flap and the spacer ribs 14 may be extruded from a different more flexible material and adhered to the body 10 by the use of extrusion methods well known in the art. The flexible flap 22 is an elongated rectangular flap extending the length of the attachment body and disposed at a downward angle in the direction of the flexible spacer ribs 14.

The weatherstripping as shown in FIG. 6 is an elongated rectangular weatherstrip brush 23 secured to an edge rod 24 which is slidingly received within a connecting channel member 25 moulded integrally with the body 10 and extending over the front wall 12 thereof adjacent an end edge 15. The weatherstrip brush 23 is retained in sliding fit within the connector channel 25 as herein shown.

FIG. 7 shows a still further type of weatherstripping and wherein an elongated tubular flexible plastic member 26 is moulded along a reinforcing rib 27 formed with the body 10. Again, the tubular member 26 may be formed of a different plastics material which is highly compressible and which can retain its flexible characteristics over a large temperature spectrum.

Figure 1:
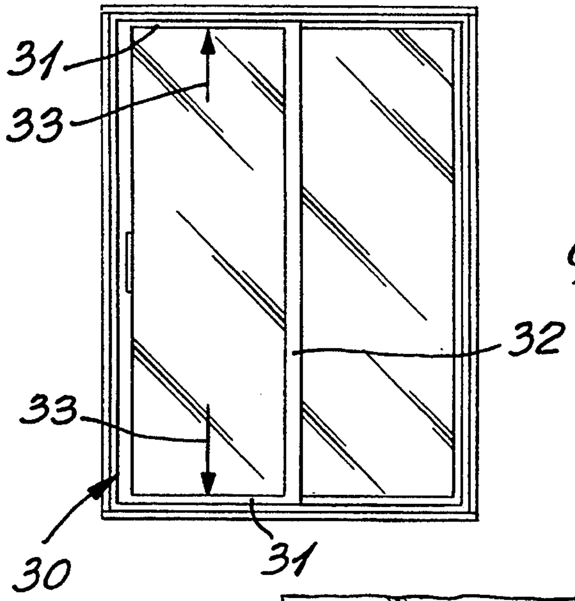
FIG. 1 is a plan view of a sliding door indicating the location of weatherstripping connectors formed in accordance with the present invention.

The weatherstripping connectors as illustrated in FIGS. 5, 6 and 7 have different utilities when applied to a sliding door assembly 30 as shown in FIG. 1. The weatherstrip brush assembly of FIG. 6 is designed for connection to the bottom and top door sills 31 of the moveable door 32 as indicated by arrows 33 and as better shown in FIG. 2B. As can be seen, the elongated attachment body 10 is adhesively secured to the sill 31 with the brush 23 disposed in contact with the sill adjacent the bottom track 34.

Figure 2A:
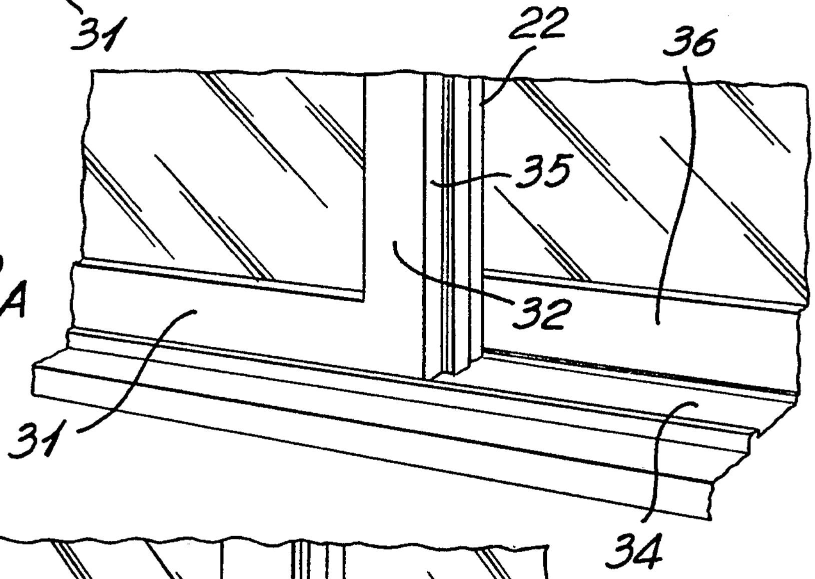
FIGS. 2A–2C are fragmented perspective views of portions of the sliding door of FIG. 1 illustrating the type of weatherstripping connectors and their securement with respect to the sliding door.
Figure 2B:
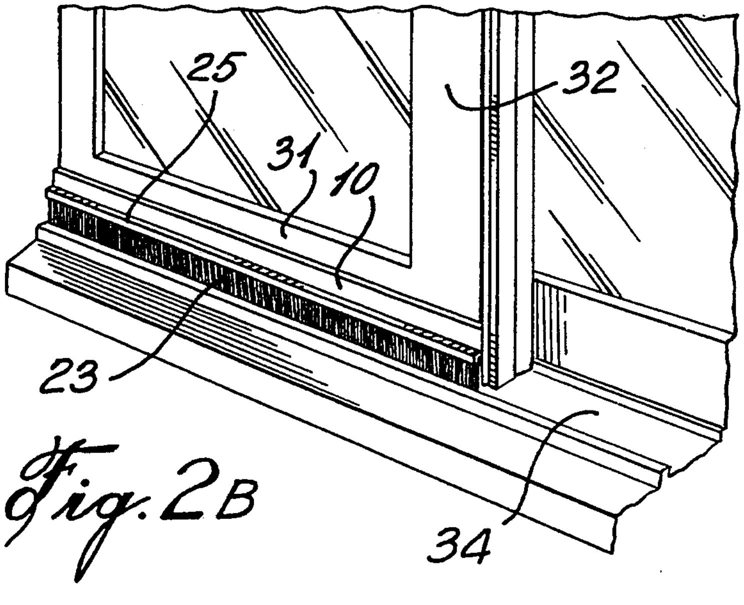
Figure 2C:
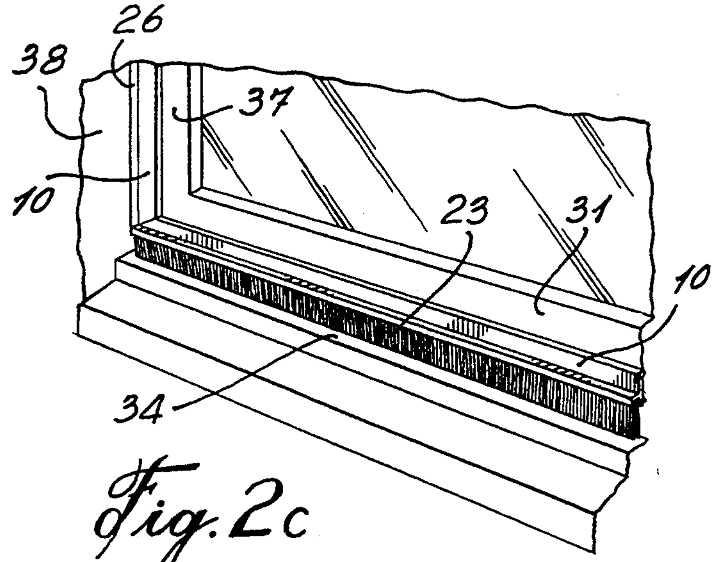

FIG. 2A illustrates the flexible flap connector 22 secured along the outside edge 35 of the moveable door 32 and it engages with the side frame (not shown) of the stationary door 36. As the moveable door 32 is displaced in the track 34, the flap 22 will flex. When the door is closed, this flap forms a seal with the side frame of the stationary door.

The tubular flexible weatherstrip of FIG. 7 is secured along the inner side frame 37 so that the tubular member 26 will abut against the door casing 38, when closed. An advantage of the weatherstripping connectors of the present invention is that they are extremely easy to install and its flexible rib features permit perfect alignment of the strips prior to connection. The strips are easily cut to size and no special tools nor screw or nail fasteners are required for these installations. In fact, the weatherstripping application of the connector strip of the present invention permits these strips to be cut by using conventional shears or scissors.

It is within the ambit of the present invention to cover any obvious modifications provided such modifications fall within the scope of the appended claims.

I claim:

1. An extruded connector strip comprising; an elongated attachment body having a flat rear attachment wall, a pair of thin spaced-apart parallel flexible spacer ribs extending from said rear attachment wall, said spacer ribs being disposed at diverging angles and sloped outwardly towards a respective elongated end edge of said attachment body, an adhesive transfer tape secured to said rear attachment wall, said tape being a double sided adhesive tape, said spacer ribs extending beyond an outer adhesive surface of said transfer tape when said tape is secured to said flat rear attachment wall between said flexible spacer ribs, said spacer ribs permitting said attachment body to be located with said rear attachment wall positioned over a connecting surface of an object to which it is intended to be secured and preventing said outer adhesive surface from contacting said connecting surface until pressure is applied to said attachment body causing said spacer ribs to flex and said outer adhesive surface to contact said connecting surface to adhere thereto, said outer adhesive surface having a retention force greater than the restoring force of said spacer ribs.

2. A connector strip as claimed in claim 1 wherein a weatherstrip element is secured to said attachment body.

3. A connector strip as claimed in claim 2 wherein said rear attachment wall is an elongated flat attachment wall.

4. A connector strip as claimed in claim 3 wherein said spacer ribs being extruded with said attachment body.

5. A connector strip as claimed in claim 4 wherein said attachment body is a rigid body of plastics material.

6. A connector strip as claimed in claim 2 wherein said weatherstrip element is a flexible flap weatherstripping secured to said attachment body.

7. A connector strip as claimed in claim 6 wherein said flexible flap weatherstripping is an elongated rectangular flap extruded with said attachment body and extending from an elongated end edge thereof.

8. A connector strip as claimed in claim 2 wherein said flexible ribs and said weatherstrip element are moulded from highly flexible plastic material onto said attachment body which is moulded from a more rigid and flexible plastic material.

9. A connector strip as claimed in claim 2 wherein said weatherstrip is an elongated tubular flexible plastic member attached to an elongated end edge of said attachment body.

10. A connector strip as claimed in claim 9 wherein said elongated end edge is a reinforced end edge having a reinforcing rib defining a wider end wall for connection of said weatherstrip thereto.

11. A connector strip as claimed in claim 2 wherein a connecting channel is moulded integrally adjacent an elongated end edge of said attachment body, said weatherstrip element being retained in sliding fit within said connecting channel.

12. A connector strip as claimed in claim 11 wherein said weatherstrip element is an elongated rectangular weatherstrip brush secured to an edge rod, said edge rod being slidingly retained within said connecting channel.

* * * * *